United States Patent [19]
Smith et al.

[11] Patent Number: 6,118,824
[45] Date of Patent: *Sep. 12, 2000

[54] SPREAD-SPECTRUM DATA PUBLISHING SYSTEM

[75] Inventors: Douglas G. Smith, Washington, D.C.; Robert C. Dixon, Palmer Lake; Jeffrey S. Vanderpool, Colorado Springs, both of Colo.

[73] Assignee: Omnipoint Corporation, Colorado Springs, Colo.

[*] Notice: This patent is subject to a terminal disclaimer.

[21] Appl. No.: 09/063,639

[22] Filed: Apr. 20, 1998

Related U.S. Application Data

[63] Continuation of application No. 08/865,563, May 29, 1997, Pat. No. 5,742,638, which is a continuation of application No. 08/345,532, Nov. 28, 1994, abandoned, which is a continuation of application No. 08/208,089, Mar. 8, 1994, abandoned, which is a continuation of application No. 07/809,194, Dec. 16, 1991, abandoned.

[51] Int. Cl.[7] .......................... H04L 12/18; H04L 27/00; H04L 29/06; H04B 1/38
[52] U.S. Cl. .......................... 375/259; 370/270; 370/347; 370/432; 375/200; 375/219; 375/316; 455/12.1; 455/73; 455/132; 455/426
[58] Field of Search .................................... 375/200, 201, 375/202, 206, 219, 316, 259; 370/270, 335, 342, 441, 479, 337, 347, 442, 498, 432; 455/12.1, 73, 1.32, 422, 426, 503

[56] References Cited

U.S. PATENT DOCUMENTS

| | | |
|---|---|---|
| Re. 27,738 | 8/1973 | Takamichi et al. ...................... 332/9 R |
| 3,934,203 | 1/1976 | Schiff ........................................ 325/65 |

(List continued on next page.)

FOREIGN PATENT DOCUMENTS

| | | | |
|---|---|---|---|
| 3984485 | 9/1985 | Austria ............................ H04B 7/26 |
| 0156335 | 10/1985 | European Pat. Off. ......... H04Q 7/04 |
| 0189695 | 6/1986 | European Pat. Off. .......... H04B 7/26 |
| 0219085 | 4/1987 | European Pat. Off. ....... H04Q 11/00 |
| 0326104 | 2/1989 | European Pat. Off. ......... H04Q 7/04 |
| 0351008 | 1/1990 | European Pat. Off. ....... H04M 11/06 |
| 3126333 | 5/1991 | Japan ............................... H04B 7/26 |
| 8700370 | 1/1987 | WIPO ............................. H04J 13/00 |
| 92/10891 | 6/1992 | WIPO ............................. H04K 1/00 |

OTHER PUBLICATIONS

Geraniotis, E., and Ghaffari, B., "Broadcast Capability of Direct Sequence and Hybrid Spread Spectrum," *IEEE Journal on Selected Areas in Communications*, vol. 8, No. 4, May 1990, pp. 489–502, May 1990.

(List continued on next page.)

*Primary Examiner*—Stephen Chin
*Assistant Examiner*—Jeffrey W. Gluck
*Attorney, Agent, or Firm*—Lyon & Lyon LLP

[57] ABSTRACT

A system for publishing data on shared broadcast channels using spread-spectrum techniques, which may comprise a spread-spectrum encoder capable of receiving data and placing it in a spread-spectrum signal format and a transmitter operating on a shared communication channel or frequency band, such as might be allocated to terrestrial point-to-point or broadcast communications. The shared communication channel may comprise a cellular system, in which data may be transmitted using spread-spectrum techniques using the transmitters and repeaters of the cellular system simultaneously with voice and other transmissions associated with the cellular system. A subscriber station may be capable of receiving using a plurality of different communication channels or frequency bands, such as a first receiver capable of cellular reception and a second receiver capable of satellite reception, at least one of which uses spread-spectrum techniques. The subscriber station may also comprise a transmitter using at least one communication channel or frequency band, so that the subscriber station may receive data or other transmissions using one channel and may request further data or other transmissions using a second channel.

20 Claims, 6 Drawing Sheets

U.S. PATENT DOCUMENTS

| | | | |
|---|---|---|---|
| 4,301,530 | 11/1981 | Gutleber | 370/18 |
| 4,314,393 | 2/1982 | Wakatsuki et al. | 29/25.35 |
| 4,338,492 | 7/1982 | Snopko | 348/552 |
| 4,355,411 | 10/1982 | Reudink et al. | 455/33 |
| 4,418,393 | 11/1983 | Zachiele, Jr. | 364/724 |
| 4,418,425 | 11/1983 | Fennel et al. | 455/27 |
| 4,425,642 | 1/1984 | Moses et al. | 370/76 |
| 4,425,661 | 1/1984 | Moses et al. | 375/1 |
| 4,432,089 | 2/1984 | Wurzburg et al. | 370/110.1 |
| 4,445,256 | 5/1984 | Huguenin et al. | 29/25.35 |
| 4,455,651 | 6/1984 | Baran | 370/104 |
| 4,456,793 | 6/1984 | Baker et al. | 179/99 |
| 4,479,226 | 10/1984 | Prabhu et al. | 375/1 |
| 4,481,640 | 11/1984 | Chow et al. | 375/1 |
| 4,484,028 | 11/1984 | Kelley et al. | 179/2 DP |
| 4,517,679 | 5/1985 | Clark et al. | 375/37 |
| 4,524,461 | 6/1985 | Kostanty et al. | 455/79 |
| 4,525,835 | 7/1985 | Vance et al. | 370/29 |
| 4,550,414 | 10/1985 | Guinon et al. | 375/1 |
| 4,561,089 | 12/1985 | Rouse et al. | 370/18 |
| 4,562,370 | 12/1985 | Von Dach | 310/312 |
| 4,563,774 | 1/1986 | Gloge | 455/607 |
| 4,567,588 | 1/1986 | Jerrim | 370/18 |
| 4,569,062 | 2/1986 | Dellande et al. | 375/117 |
| 4,587,662 | 5/1986 | Langewellpott | 375/1 |
| 4,601,047 | 7/1986 | Horwitz et al. | 375/2.2 |
| 4,606,039 | 8/1986 | Nicolas et al. | 375/1 |
| 4,612,637 | 9/1986 | Davis et al. | 370/95 |
| 4,621,365 | 11/1986 | Chiu | 375/1 |
| 4,622,854 | 11/1986 | Locke et al. | 73/703 |
| 4,630,283 | 12/1986 | Schiff | 375/1 |
| 4,641,317 | 2/1987 | Fullerton | 375/1 |
| 4,642,505 | 2/1987 | Arvanitis | 310/312 |
| 4,647,863 | 3/1987 | Skudera, Jr. et al. | 329/112 |
| 4,649,549 | 3/1987 | Halpern et al. | 380/32 |
| 4,653,069 | 3/1987 | Roeder | 380/31 |
| 4,660,164 | 4/1987 | Leibowitz | 364/728 |
| 4,672,254 | 6/1987 | Dolat et al. | 310/313 |
| 4,672,658 | 6/1987 | Kavehrad et al. | 379/63 |
| 4,675,863 | 6/1987 | Paneth et al. | 370/50 |
| 4,680,785 | 7/1987 | Akiyama et al. | 379/57 |
| 4,688,210 | 8/1987 | Eizenhofer et al. | 370/18 |
| 4,691,326 | 9/1987 | Tsuchiya | 375/1 |
| 4,701,904 | 10/1987 | Darcie | 370/3 |
| 4,703,474 | 10/1987 | Foschini et al. | 370/18 |
| 4,707,839 | 11/1987 | Andren et al. | 375/1 |
| 4,718,080 | 1/1988 | Serrano | 379/99 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,745,378 | 5/1988 | Niitsuma et al. | 333/196 |
| 4,754,453 | 6/1988 | Eizenhofer | 370/95 |
| 4,754,473 | 6/1988 | Edwards | 379/58 |
| 4,759,034 | 7/1988 | Nagazumi | 375/1 |
| 4,759,078 | 7/1988 | Schiller | 455/49 |
| 4,765,753 | 8/1988 | Schmidt | 379/60 |
| 4,769,812 | 9/1988 | Shimizu | 370/67 |
| 4,787,093 | 11/1988 | Rorden | 375/23 |
| 4,797,947 | 1/1989 | Labedz | 455/33 |
| 4,800,885 | 1/1989 | Johnson | 128/633 |
| 4,804,938 | 2/1989 | Rouse et al. | 340/310 |
| 4,805,208 | 2/1989 | Schwartz | 379/93 |
| 4,807,222 | 2/1989 | Amitay | 370/85 |
| 4,811,357 | 3/1989 | Betts et al. | 375/1 |
| 4,813,057 | 3/1989 | Fullerton | 375/37 |
| 4,815,106 | 3/1989 | Propp et al. | 375/36 |
| 4,817,089 | 3/1989 | Paneth et al. | 370/95 |
| 4,833,702 | 5/1989 | Shitara et al. | 379/60 |
| 4,837,786 | 6/1989 | Gurantz et al. | 370/20 |
| 4,837,802 | 6/1989 | Higashiyama et al. | 379/62 |
| 4,860,307 | 8/1989 | Nakayama | 375/1 |
| 4,864,589 | 9/1989 | Endo | 375/1 |
| 4,866,732 | 9/1989 | Carey et al. | 375/1 |
| 4,878,238 | 10/1989 | Rash et al. | 379/62 |
| 4,893,327 | 1/1990 | Stern et al. | 379/59 |
| 4,894,842 | 1/1990 | Broekhaven et al. | 375/1 |
| 4,901,307 | 2/1990 | Gilhousen et al. | 370/18 |
| 4,905,221 | 2/1990 | Ichiyoshi | 370/18 |
| 4,912,705 | 3/1990 | Paneth et al. | 370/95.1 |
| 4,918,689 | 4/1990 | Hui | 370/85 |
| 4,928,274 | 5/1990 | Gilhousen et al. | 370/92 |
| 4,943,973 | 7/1990 | Werner | 375/1 |
| 4,965,759 | 10/1990 | Uchida et al. | 364/604 |
| 4,979,170 | 12/1990 | Gilhousen et al. | 370/104.1 |
| 4,979,186 | 12/1990 | Fullerton | 375/23 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,953 | 4/1991 | Dahlin et al. | 455/33 |
| 5,016,255 | 5/1991 | Dixon et al. | 375/1 |
| 5,018,165 | 5/1991 | Sohner et al. | 375/1 |
| 5,022,024 | 6/1991 | Paneth et al. | 370/50 |
| 5,022,046 | 6/1991 | Morrow | 375/1 |
| 5,022,047 | 6/1991 | Dixon et al. | 375/1 |
| 5,023,887 | 6/1991 | Takeuchi et al. | 375/1 |
| 5,025,452 | 6/1991 | Sohner et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,056,109 | 10/1991 | Gilhousen et al. | 375/1 |
| 5,058,138 | 10/1991 | Figura et al. | 375/316 |
| 5,073,899 | 12/1991 | Collier et al. | 375/1 |
| 5,073,900 | 12/1991 | Mallinckrodt | 375/1 |
| 5,081,642 | 1/1992 | O'Clock et al. | 375/1 |
| 5,101,501 | 3/1992 | Gilhousen et al. | 375/1 |
| 5,109,390 | 4/1992 | Gilhousen et al. | 375/1 |
| 5,117,423 | 5/1992 | Shepherd et al. | 370/95.1 |
| 5,119,375 | 6/1992 | Paneth et al. | 370/95.1 |
| 5,121,391 | 6/1992 | Paneth et al. | 370/95.1 |
| 5,132,986 | 7/1992 | Endo et al. | 370/18 |
| 5,153,598 | 10/1992 | Alves, Jr. | 342/352 |
| 5,157,686 | 10/1992 | Omura et al. | 375/1 |
| 5,166,952 | 11/1992 | Omura et al. | 375/1 |
| 5,177,765 | 1/1993 | Holland et al. | 375/1 |
| 5,177,766 | 1/1993 | Holland et al. | 375/1 |
| 5,185,762 | 2/1993 | Schilling | 375/1 |
| 5,193,101 | 3/1993 | McDonald et al. | 375/1 |
| 5,195,090 | 3/1993 | Bolliger et al. | 370/94.1 |
| 5,195,091 | 3/1993 | Farwell et al. | 370/94.1 |
| 5,218,618 | 6/1993 | Sagey | 375/1 |
| 5,224,120 | 6/1993 | Schilling | 375/1 |
| 5,228,053 | 7/1993 | Miller et al. | 375/1 |
| 5,228,056 | 7/1993 | Schilling | 375/1 |
| 5,239,671 | 8/1993 | Linquist et al. | 455/13.1 |
| 5,253,268 | 10/1993 | Omura et al. | 375/1 |
| 5,263,045 | 11/1993 | Schilling | 375/1 |
| 5,274,665 | 12/1993 | Schilling | 375/1 |
| 5,285,469 | 2/1994 | Vanderpool | 375/1 |
| 5,289,497 | 2/1994 | Jacobson et al. | 375/1 |
| 5,291,515 | 3/1994 | Uchida | 370/18 |
| 5,291,516 | 3/1994 | Dixon et al. | 375/1 |
| 5,303,286 | 4/1994 | Wiedeman | 379/59 |
| 5,303,393 | 4/1994 | Noreen et al. | 455/3.2 |
| 5,319,634 | 6/1994 | Bartholemew | 370/18 |
| 5,351,269 | 9/1994 | Schilling | 375/1 |
| 5,402,413 | 3/1995 | Dixon | 370/18 |
| 5,455,822 | 10/1995 | Dixon et al. | 370/18 |
| 5,469,468 | 11/1995 | Schilling | 375/200 |
| 5,515,378 | 5/1996 | Roy, III et al. | 370/95.1 |
| 5,742,638 | 4/1998 | Smith | 375/200 |
| 3,978,436 | 8/1976 | Alig et al. | 333/30 R |

| | | | |
|---|---|---|---|
| 4,021,898 | 5/1977 | Willis et al. | 29/25.35 |
| 4,051,448 | 9/1977 | Coussot | 333/30 |
| 4,100,498 | 7/1978 | Alsup et al. | 328/14 |
| 4,131,484 | 12/1978 | Caruso et al. | 134/1 |
| 4,163,944 | 8/1979 | Chambers et al. | 325/446 |
| 4,189,677 | 2/1980 | Cooper et al. | 325/321 |
| 4,217,563 | 8/1980 | Vale | 333/150 |
| 4,222,115 | 9/1980 | Cooper et al. | 375/1 |
| 4,247,942 | 1/1981 | Hauer | 375/75 |

OTHER PUBLICATIONS

Shaft, Paul D., "Low–Rate Convolutional Code Applications in Spread–Spectrum Communications," *IEEE Transactions on Communications*, Com–25(8):815–821 (Aug. 1977).

Mohanty, Nirode C., "Spread Spectrum and Time Division Multiple Access Satellite Communications," *IEEE Transactions on Communications*, vol. Com–25, No. 8, Aug. 1977, pp. 810–815.

Mohsen, K. et al., "Direct Sequence Spread Spectrum with DPSK Modulation and Diversity for Indoor Wire–less Communications," *IEEE Transactions on Communications*, Feb. 1987, vol. Com–35, No. 2, pp. 224–226.

M. Kavehrad and P.J. McLane, "Performance of Low–Complexity Channel Coding and Diversity for Spread Spectrum in Indoor, Wireless Communication," *AT&T Technical Journal*, vol. 64, No. 8, Oct. 1985, pp. 1927–1965.

Kavehrad, M. and McLane, P.J., "Spread Spectrum for Indoor Digital Radio," *IEEE Communications Magazine*, Jun. 1987, vol. 25, No. 5, at 32–40.\*\*

J.H. Collins & P.M. Grant, "The Role of Surface Acoustic Wave Technology in Communication Systems," *Ultrasonics*, Mar. 1972, vol. 10, No. 2, pp. 59–71.

Manfred G. Unkauf, "Surface Wave Devices in Spread Spectrum Systems," *Surface Wave Filters* (Wiley 1977), pp. 477–509.

Dixon, Robert C., Spread Spectrum Systems, (J. Wiley & Sons, 2d ed. 1984), pp. 84–86, 206, 230–232.

Ralph Eschenbach, "Application of Spread Spectrum Radio to Indoor Data Communications," Hewlett–Packard Laboratories, *IEEE* 1982, pp. 34.5–1'34.5–3.

Payne Freret et al., "Application of Spread–Spectrum Radio to Wireless Terminal Communications," Hewlett–Packard Laboratories, *IEEE* 1980, pp. 69.7.1—69.7.4.

Payne Freret, "Wireless Terminal Communications Using Spread–Spectrum Radio," Hewlett–Packard Laboratories, *IEEE* 1980, pp. 244–247.

Coll, D.C. and Zervos, N., "The Use of Spread Spectrum Modulation for the Co–channel Transmission of Data and Television," *IEEE* 1979, pp. 15.4.1'15.4.5.

SPREAD-SPECTRUM DATA PUBLISHING SYSTEM

This is a continuation of application Ser. No. 08/865,563, filed on May 29, 1997, now U.S. Pat. No. 5,742,638, which is a continuation of application Ser. No. 08/345,532, filed Nov. 28, 1994, now abandoned, which is a continuation of application Ser. No. 08/208,089, filed Mar. 8, 1994, now abandoned, which is a continuation of application Ser. No. 07/809,194, filed Dec. 16, 1991, now abandoned.

BACKGROUND OF THE INVENTION

1. Field of the Invention

This invention relates to a system for publishing data by broadcast or related technology. More specifically, this invention relates to a system for publishing data on shared channels using spread-spectrum techniques.

2. Description of Related Art

Data publishing is the process of transmitting data to recipients by means of electronic communication channels, such as broadcast or related communication methods. One motive for data publishing is that it may be easier or less expensive to transmit data to recipients by means of broadcast than it would be to write that data onto physical media (such as paper or magnetic disks or tapes) and carry the physical media to them. Another motive is that the marginal cost of publishing the same data to an additional recipient may be comparatively small. Data publishing may be particularly advantageous when the data to be published are voluminous, rapidly changing, or must be delivered within a short time to be useful. A classic example of such data is stock-market trading data, although there are many other cases where data publishing would be advantageous.

One problem which has arisen in the art is the lack of sufficient broadcast infrastructure for data publishing. There are few if any broadcast towers, repeaters, or receivers for use with data publishing, so it has been generally necessary to use infrastructure which is already associated with another form of communication. Hence the use of telephone, television, radio and satellite systems noted above. Accordingly, it would be advantageous to provide a method of data publishing which did not require construction of large amounts of additional infrastructure.

Another problem which has arisen in the art is that it may be difficult to obtain sufficient bandwidth, at reasonable cost and without excessive difficulty, to publish the data. Lack of bandwidth naturally either reduces the amount of data which can be published, or increases the amount of time which is required to publish the data to recipients.

One method of the prior art is to make use of spare bandwidth from an extant communication system. Examples include telephone (using data-over-voice), television (using vertical blanking intervals), and radio (using FM sidebands) systems. While this method achieves a limited degree of success, it has been subject to the drawback that it has not been able to deliver bandwidth to support publishing of large amounts of data. For example, while television systems have a great deal of broadcast bandwidth, the amount of bandwidth for data publishing available by means of the vertical blanking interval is relatively limited. Another problem is that this prior art method does not generally provide national coverage.

Another method of the prior art is to allocate separate frequency bands in which to publish the data. Examples of this method include satellite systems with dedicated channels. While this method is able to deliver a greater amount of bandwidth for data publishing, it has been subject to the drawback that allocation of separate frequency bands for data publishing may generally require proceedings before the FCC or other government agencies.

Another method of the prior art is to use leased lines or other telephone lines to publish the data serially to multiple receiving sites. While this method is able to deliver the data to receiving sites, it has been subject to the drawback that it requires a great deal of money in leased line charges or telephone charges, and therefore may not be economical.

Accordingly, it would be advantageous to provide a method of data publishing which allowed easier access to sufficient bandwidth for data publishing.

SUMMARY OF THE INVENTION

The invention provides a system for publishing data on shared broadcast channels using spread-spectrum techniques. The system may comprise a spread-spectrum encoder capable of receiving data and placing it in a spread-spectrum signal format and a transmitter operating on a shared communication channel or frequency band, such as might be allocated to terrestrial point-to-point or broadcast communications. In a preferred embodiment, the shared communication channel may comprise a cellular system, in which data may be transmitted using spread-spectrum techniques using the transmitters and repeaters of the cellular system simultaneously with voice and other transmissions associated with the cellular system.

In a preferred embodiment, a subscriber station may be capable of receiving using a plurality of different communication channels or frequency bands, such as a first receiver capable of cellular reception and a second receiver capable of satellite reception, at least one of which uses spread-spectrum techniques. The subscriber station may also comprise a transmitter using at least one communication channel or frequency band, so that the subscriber station may receive data or other transmissions using one channel and may request further data or other transmissions using a second channel. For example, the subscriber station may comprise a cellular transmitter and receiver, and a satellite receiver.

Communication may be carried out using an M-ary spread-spectrum technique, wherein each of a plurality of spread-spectrum codes corresponds to a unique sequence of data bits to be transmitted. Communication may also be carried out within a geographical region using time division multiplexing or time division multiple access (TDMA), as well as frequency division multiplexing and/or code division multiplexing. A dual-mode receiver may be configured to receive either spread-spectrum signals or narrowband signals over one or more bandwidths.

DESCRIPTION OF THE PREFERRED EMBODIMENT

Figure 1:
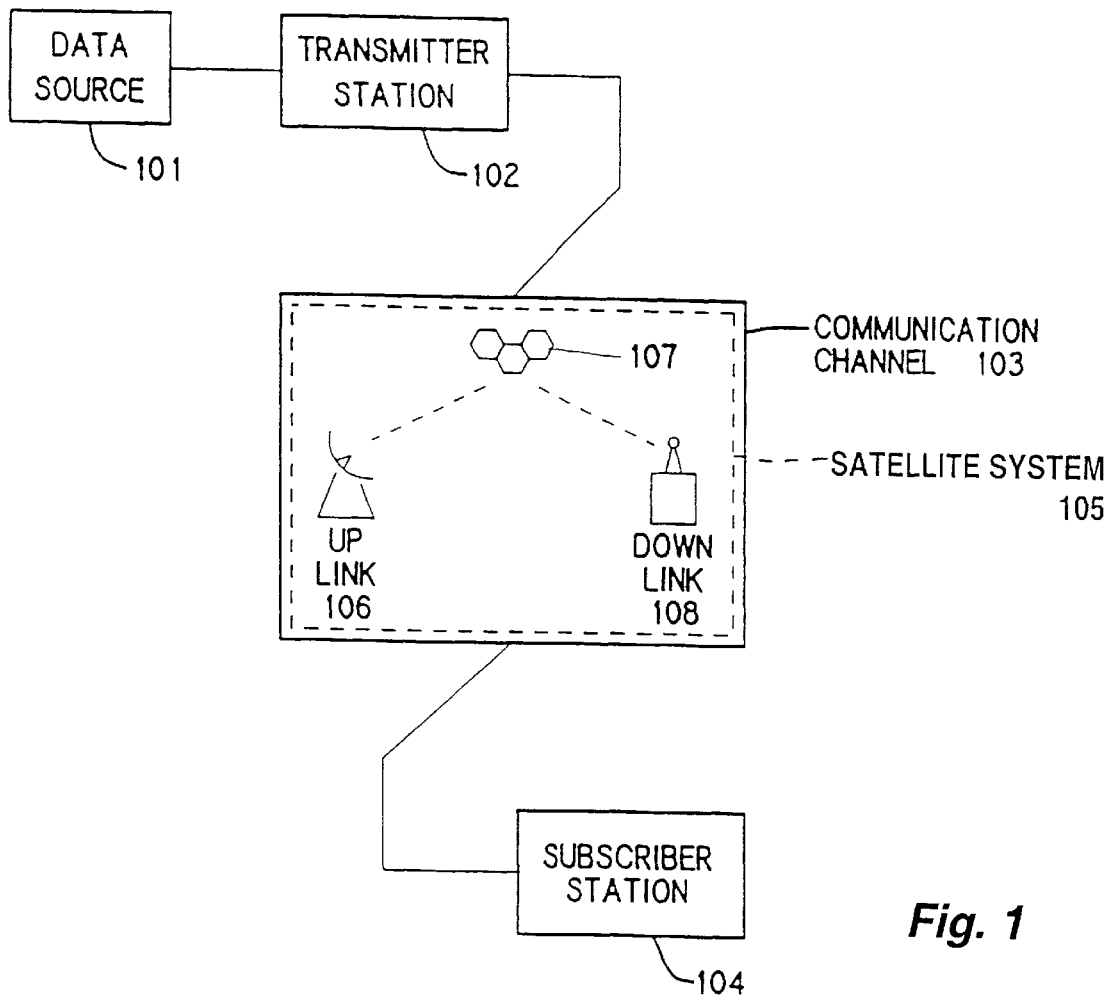
FIG. 1 shows a block diagram of a system for data publishing.

FIG. 1 shows a block diagram of a system for data publishing.

A system for data publishing may comprise a data source 101, a transmitter station 102, a communication channel 103, and a subscriber station 104. The data source 101 may originate the data to be published (or may format it for publication). The transmitter station 102 may receive the data and place it in a spread-spectrum signal format for transmission over the communication channel 103. The communication channel 103 may couple the data (in a spread-spectrum signal format) to one or more subscriber stations 104. The subscriber stations 104 may receive the data and decode it from the spread-spectrum format.

In a preferred embodiment, the data source 101 may originate (or format) a variety of different types of data to be published. These may include: text, graphics, digitized voice, digitized images or moving video, or mixed media; financial, news and weather data, including digitized photos and weather maps; airline and rail scheduling data; updates for in-store retail displays, including high-resolution graphic advertisements and animation; credit and credit card data for in-store approval and verification; encyclopedia or other database contents, including chemical, legal, medical, and pharmacological databases, and advertising and telephone listings; high-quality telecopier images and other print images; and updates for documentation manuals, including airline, automotive and computer manuals.

In a preferred embodiment, the subscriber stations 104 may each comprise a multitasking processor which may perform communication tasks in parallel with other tasks, and which may be coupled to a LAN (local area network) or WAN (wide area network) for retransmitting data to other cooperating processors.

In a preferred embodiment, the communication channel 103 may comprise a satellite system 105, having an uplink station 106, a satellite and transponder 107 (preferably with a wide area footprint), and a downlink station 108, as is well known in the art of satellite communication. The uplink station 106 may be coupled to the transmitter station 102; the downlink station 108 may be coupled to the subscriber station 104 and may comprise an indoor mountable one-foot antenna, as is well known in the art of satellite communication.

In a preferred embodiment, the transmitter station 102 and the subscriber station 104 may comprise inventions disclosed in U.S. Pat. Nos. 5,016,255, 5,022,047, 5,276,704, 5,081,642, 5,455,822, 5,396,515, 5,499,265 and 5,291,516, all of which are hereby incorporated by reference as if fully set forth herein, and the spread-spectrum signal format may comprise signal formats disclosed therein.

Figure 2:
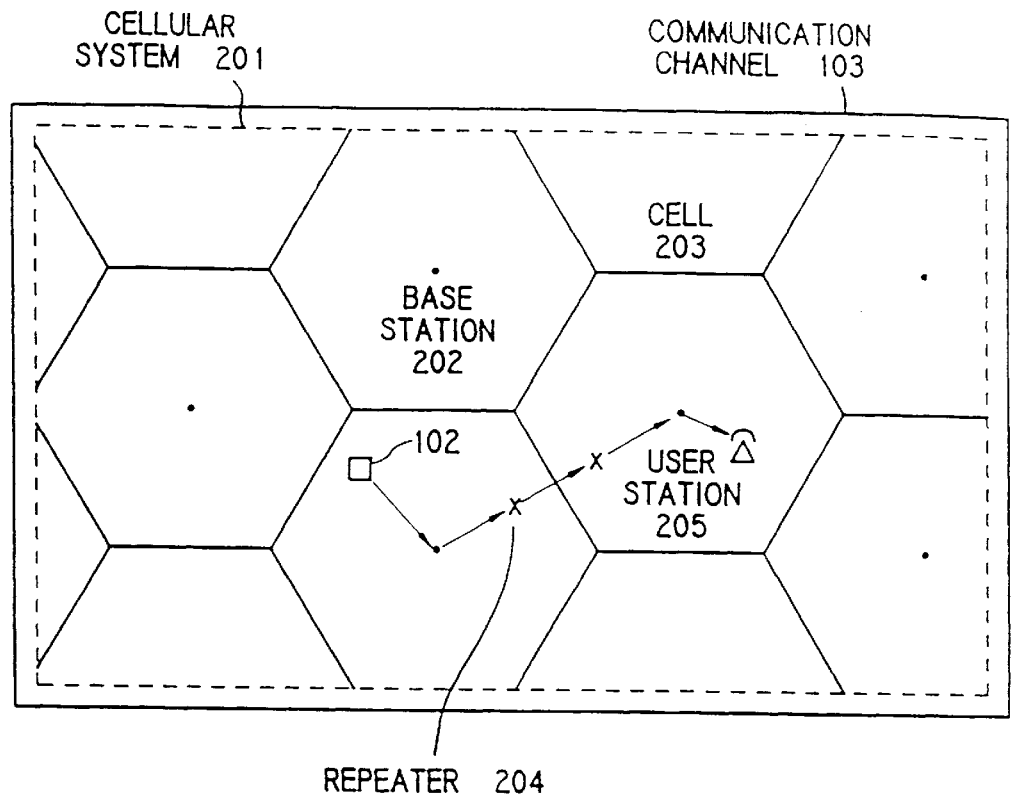
FIG. 2 shows a block diagram of a cellular system communication channel in a system for data publishing.

FIG. 2 shows a block diagram of a cellular system communication channel in a system for data publishing.

In a preferred embodiment, the communication channel 103 may comprise a shared communication channel or frequency band, such as might be allocated to terrestrial point-to-point or broadcast communications. In particular, in a preferred embodiment, the communication channel 103 may comprise a cellular system 201, with a set of base stations 202 and a set of cells 203. In the cellular system 201, the data to be published may be transmitted using the frequency bands allocated to the cellular system 201, from the transmitter station 102 to a transmitter base station 202, to a receiver base station 202 (possibly by means of a set of repeaters 204), to a user station 205. In a preferred embodiment, the transmitter station 102 may be collocated with the transmitter base station 202, may be coupled thereto by means of cabling, and may even share the same antenna. Return messages may be transmitted from the user station 205 to the transmitter station 102 in like manner.

Because the data to be published is transmitted in a spread-spectrum signal format, it may use the same frequency bands allocated to the cellular system 201 simultaneously with other transmissions associated with the cellular system 201 and without interfering with those other transmissions. Moreover, the data to be published (in its spread-spectrum signal format) may be routed in the cellular system 201 and transmitted from base station 202 to base station 202 without loss of data and without substantial modification of the cellular system 201.

In a preferred embodiment, the cellular system 201 may comprise inventions disclosed in U.S. Pat. Nos. 5,402,413 and 5,285,469, all of which are hereby incorporated by reference as if fully set forth herein.

Figure 5:
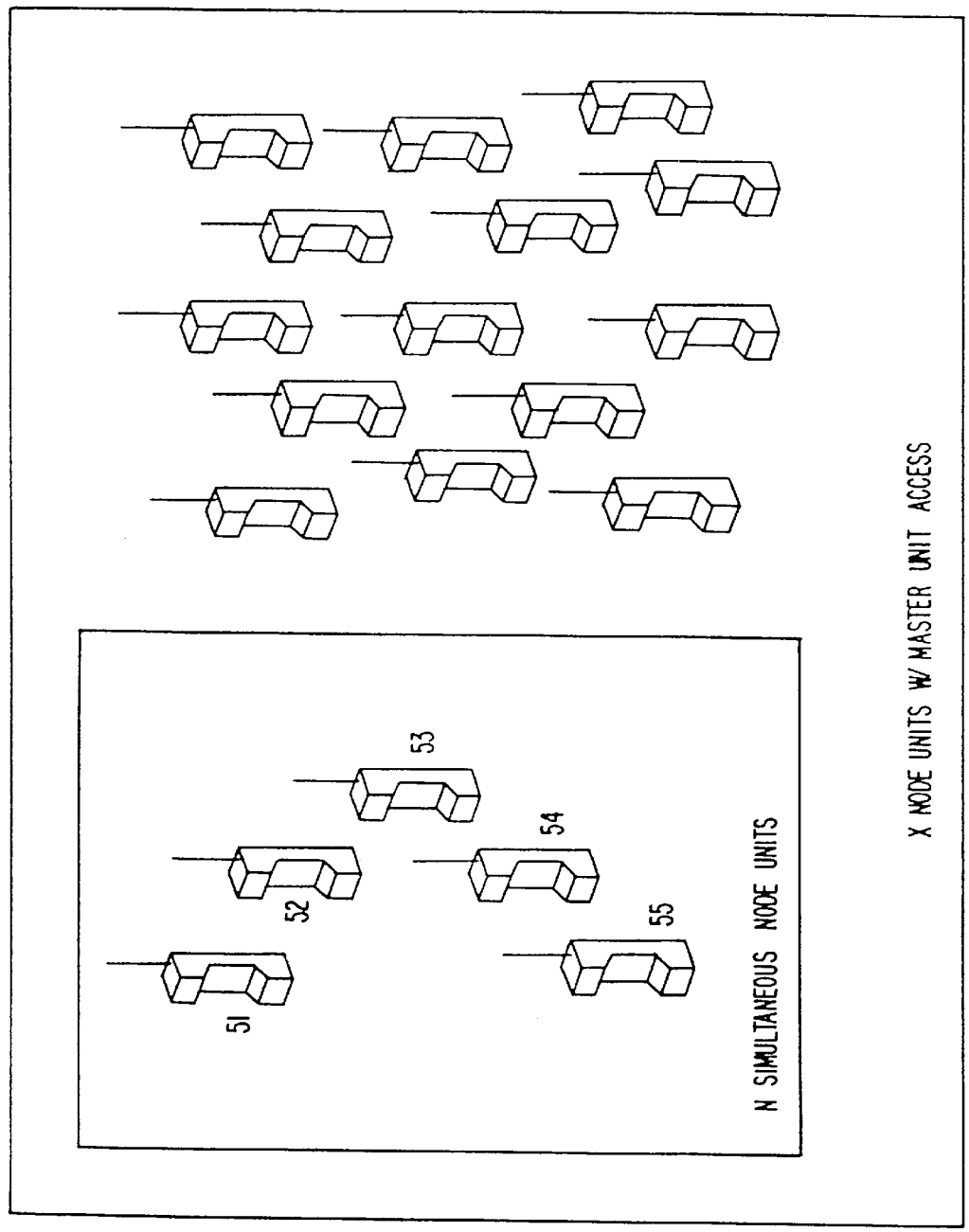
FIG. 5 shows a diagram of a base station capable of communicating with a plurality of subscriber stations.
Figure 5:
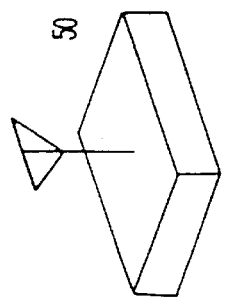

In one embodiment, the cellular system 201 employs a time division multiple access technique. FIG. 5 is a diagram of a master unit 50 and N node units. The master unit 50 may be a base station, PBX, file server or other central controlling device serving as the center of a star network, and the node units may be any type of computer, communications, telephone, video or other data device serving as a node point in the star network. As illustratively shown in FIG. 5, a master unit 50 is shown with a plurality of N node units 51, 52, 53, 54, 55, where N=5, and a plurality of X node units 56, of which the plurality N node units is a subset.

Figure 6:
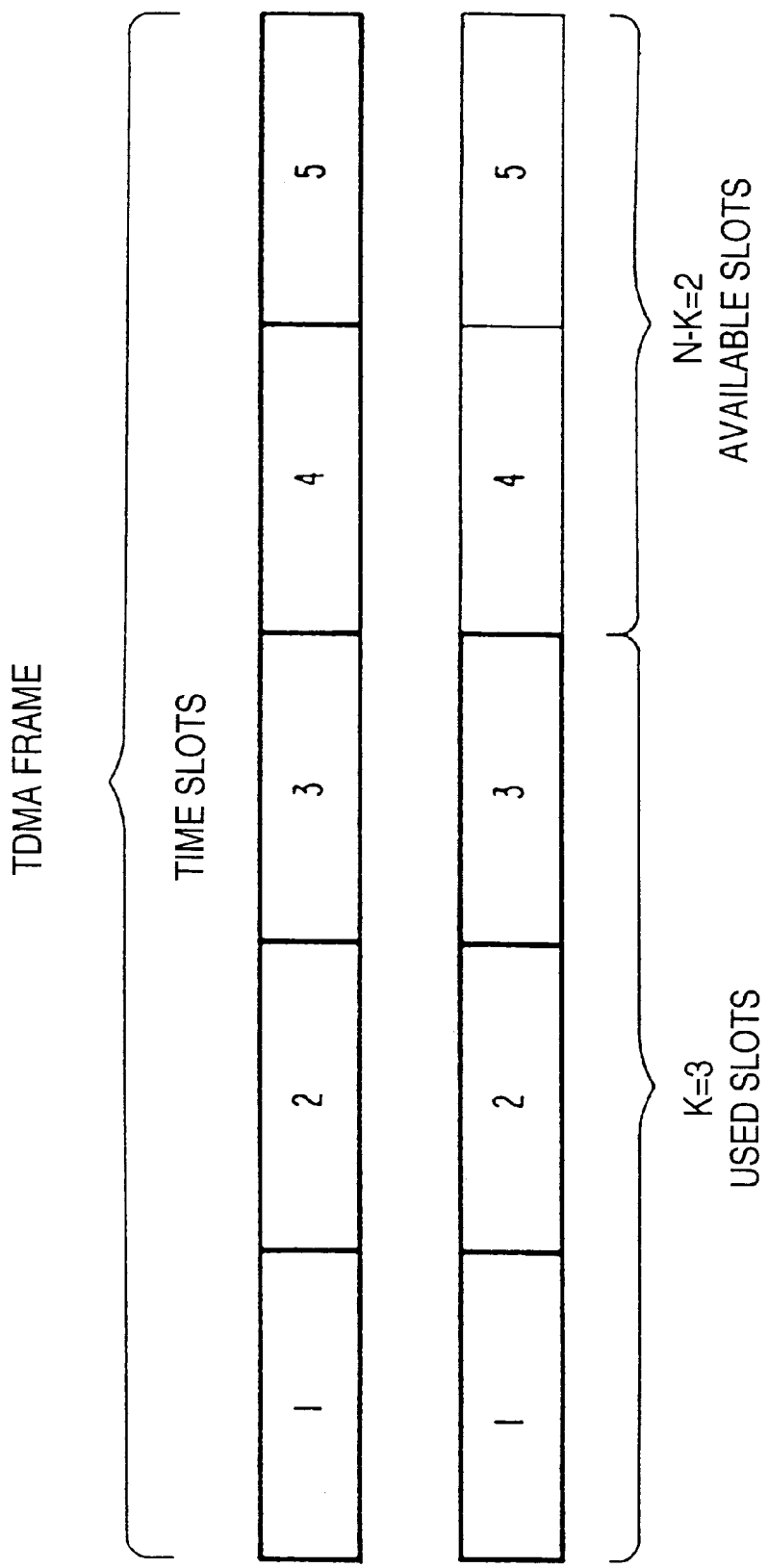
FIG. 6 shows a diagram of a time frame divided into a plurality of time slots.

An exemplary time frame for time division multiple access is shown in FIG. 6. In the embodiment of FIG. 6, a total of five time slots, which constitute a time frame, are assumed available for communicating with the master unit 50 by use of time division multiple access. As used herein, use of the term transmitting and/or receiving in a time slot may include transmitting or receiving in a plurality of time slots in a slot position within a frame and/or from frame to frame. Transmitting and/or receiving in a particular time slot also does not limit a time slot to a particular slot position within a frame.

In another embodiment, the cells of the cellular system 201 shown in FIG. 2 are disposed in a three-cell repeating pattern such as described in U.S. Pat. No. 5,402,413. Isolation between cells may be provided by frequency division multiplexing, code division multiplexing, and/or time division multiplexing.

Figure 3:
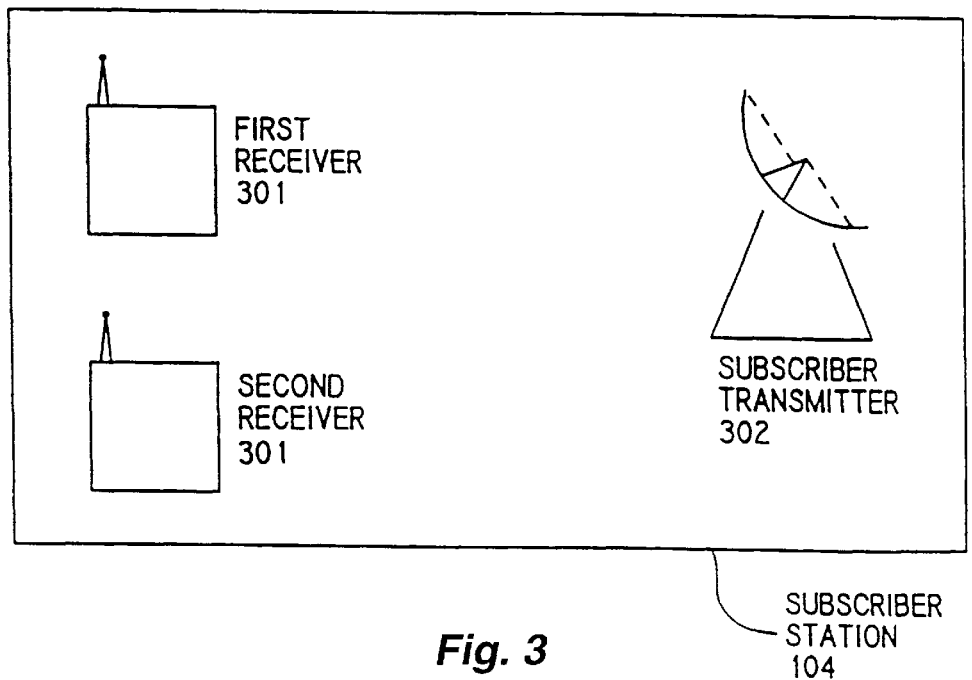
FIG. 3 shows a block diagram of a subscriber station.

FIG. 3 shows a block diagram of a subscriber station.

In a preferred embodiment, the subscriber station 104 may comprise a first receiver 301 operating on a first communication channel 103 and a second receiver 301 operating on a second communication channel 103, at least one of which uses spread-spectrum techniques. For example, in a preferred embodiment, the first communication channel 103 may comprise the cellular system 201 shown in FIG. 2, and the second communication channel 103 may comprise the satellite system 105 shown in FIG. 1.

In some embodiments, the first receiver 301 may support two or more operating modes over the cellular system 201 by the same receiver configuration, such as described in U.S. Pat. No. 5,291,516. For example, one embodiment includes a telephone whose first mode comprises analog voice techniques and traditional cellular frequency division multiplexed operation employing, but not limited to, narrowband radio frequency modulation techniques, such as FM, and whose second mode includes spread spectrum radio frequency modulation, and which may include time and/or frequency division multiplexing techniques, where the narrowband and spread spectrum modes occupy common frequency bands.

Another embodiment includes a telephone whose first mode comprises cellular frequency division multiplexed operation employing, but not limited to, narrowband radio frequency modulation techniques, such as FM, coupled with digital voice commanding and/or compression and/or time division multiplexing techniques, and whose second mode includes spread spectrum radio frequency modulation, and which may include time and/or frequency division multiplexing techniques, where the narrowband and spread spectrum modes occupy common frequency bands.

In a preferred embodiment, the subscriber station 104 may also comprise a subscriber transmitter 302 operating on a third communication channel 103, and the transmitter station 102 may comprise a receiver operating on that third communication channel 103. For example, in a preferred embodiment, the third communication channel 103 may also comprise the cellular system 201 shown in FIG. 2 (i.e., the third communication channel 103 is the same as the first communication channel 103), so that the cellular system 201 may be used for two-way communication between the transmitter station 102 and the subscriber station 104. The transmitter station 102 and the subscriber station 104 may communicate using time-division multiple access, wherein a time period is divided into a plurality of time slots, and communication is carried out in a designated time slot or time slots.

The subscriber station 104 may thus receive data to be published (as well as other information described with reference to FIG. 1), and respond, by means of the cellular system 201. The response may comprise a request for further data or other transmissions by means of the satellite system 105, and the transmitter station 102 may answer that request with further data transmitted by means of the satellite system 105.

Figure 7:
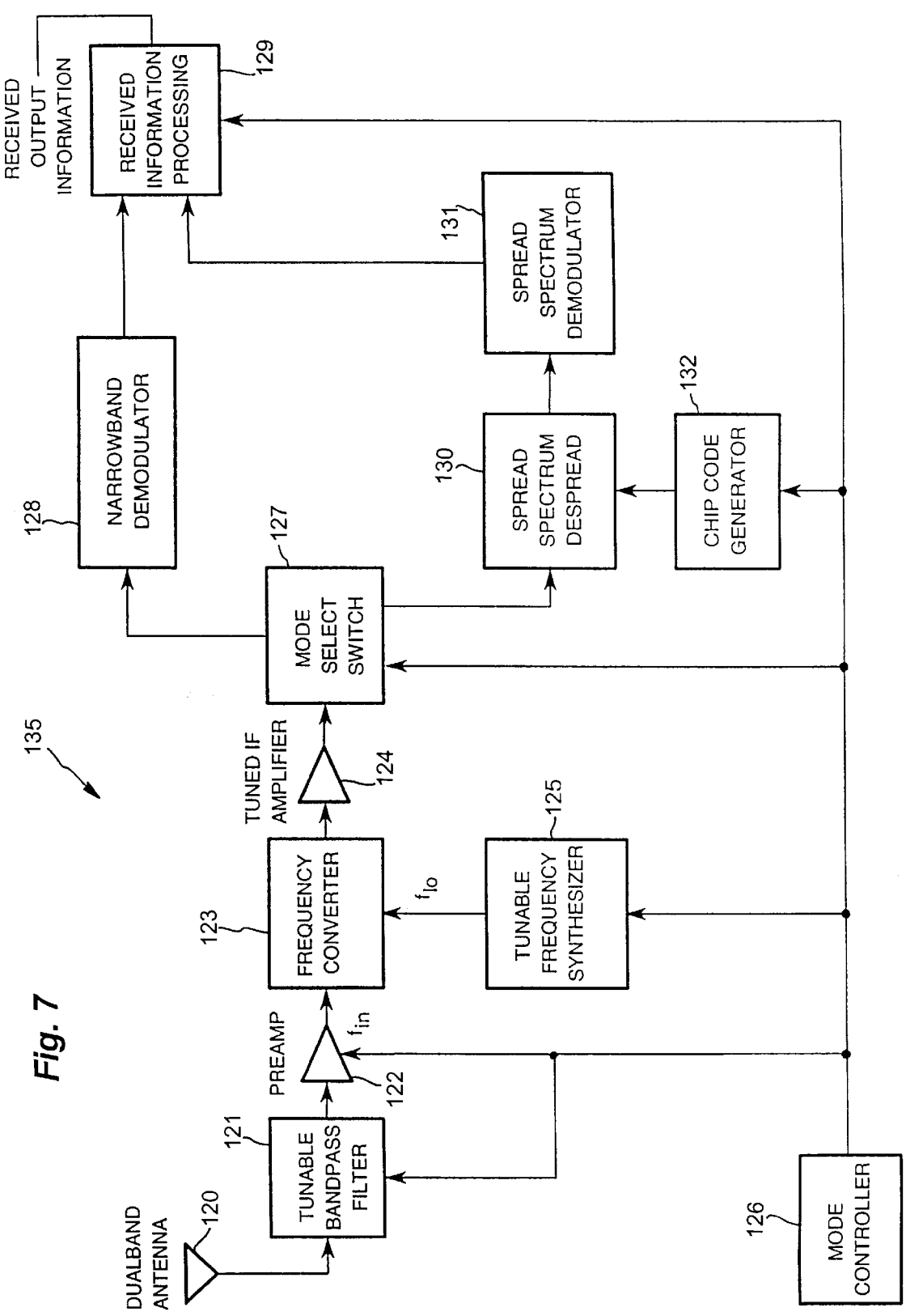
FIG. 7 shows a dual-mode receiver block diagram.

FIG. 7 shows an embodiment of a dual-mode receiver block diagram.

The dual mode receiver 135 of FIG. 7 has as its first mode operational capabilities which allow cellular functionality, and a second mode which allows for microcellular operation. Functionality in the first, or cellular, mode includes a relatively high power cellular telephone employing analog or digital voice techniques in conjunction with frequency, and/or time division traditional narrowband radio techniques. Functionality in the second, or microcellular, mode includes a low power microcellular telephone using digital voice techniques in conjunction with frequency, time and/or code division spread spectrum radio techniques, where the cellular and microcellular functions either share the same frequency bands, or are offset from each other.

More specifically, the dual mode receiver 135 includes a mode controller 126, a tunable-frequency synthesizer 125, a chip-code generator 132, an antenna 120, an adjustable bandpass filter 121, a preamplifier 122, a frequency converter 123, an IF amplifier 124, a mode select switch 127, a spread-spectrum despreader 130, a spread-spectrum demodulator 131, a narrowband demodulator 128, and receiver-information processing means. The receiver-information means is embodied as a receiver-information processing device 129. The adjustable bandpass filter 121 is coupled to the antenna 120 and to the mode controller 126. The preamplifier 122 is coupled to the adjustable bandpass filter 121 and to the mode controller 126. The frequency converter 123 is coupled to the preamplifier 122 and the tunable-frequency synthesizer 125. The IF amplifier 124 is coupled to the frequency converter 123. The spread-spectrum despreader 130 is coupled to the chip-code generator 132 and, through the mode select switch 127, to the IF amplifier 124. The spread-spectrum demodulator 131 is coupled to the spread-spectrum despreader 130. The narrowband demodulator 128 is coupled through the mode select switch 127 to the IF amplifier 124.

The mode controller 126 is used to select reception of narrowband or spread-spectrum modulation. The tunable-frequency synthesizer 125 generates a local oscillator signal, and the chip-code generator 132 generates a reference chip-code signal for comparison with the received chip code signal.

When the mode controller 126 is set to narrowband modulation, the adjustable bandpass filter 121 is adjusted to a narrow bandwidth and corresponding frequency for passing the narrowband modulated signal. With a spread-spectrum setting of the mode controller 126, the adjustable bandpass filter 121 is adjusted to a wide bandwidth and corresponding frequency for passing the spread-spectrum signal. The preamplifier 122 amplifies the filtered narrowband modulated signal when the mode controller 126 is set to the narrowband modulation setting, and amplifies the filtered spread-spectrum signal when the mode controller 126 is set to the spread-spectrum modulation setting. The preamplifier 122 is switch selectable to the appropriate band for each mode where the dual modes occupy non-contiguous or widely separated frequency bands. The frequency converter 123 converts, using the local oscillator signal, the filtered narrowband modulated signal and the filtered spread-spectrum signal to an IF signal.

The IF amplifier 124 amplifies the received signal and applies it to the mode select switch 127 whose output goes to either the narrowband demodulator 128 or the spread-spectrum despreader 130.

FIG. 7 illustrates the implementation of a dual-mode receiver 135 for use in any conventional narrowband application with capability to switch to a separate frequency band while employing spread spectrum modulation/demodulation in the alternate operating band.

Further specifics regarding the operation of the dual-mode receiver 135 may be found in U.S. Pat. No. 5,291,516, which is incorporated herein by reference as if fully set forth herein.

Figure 4:
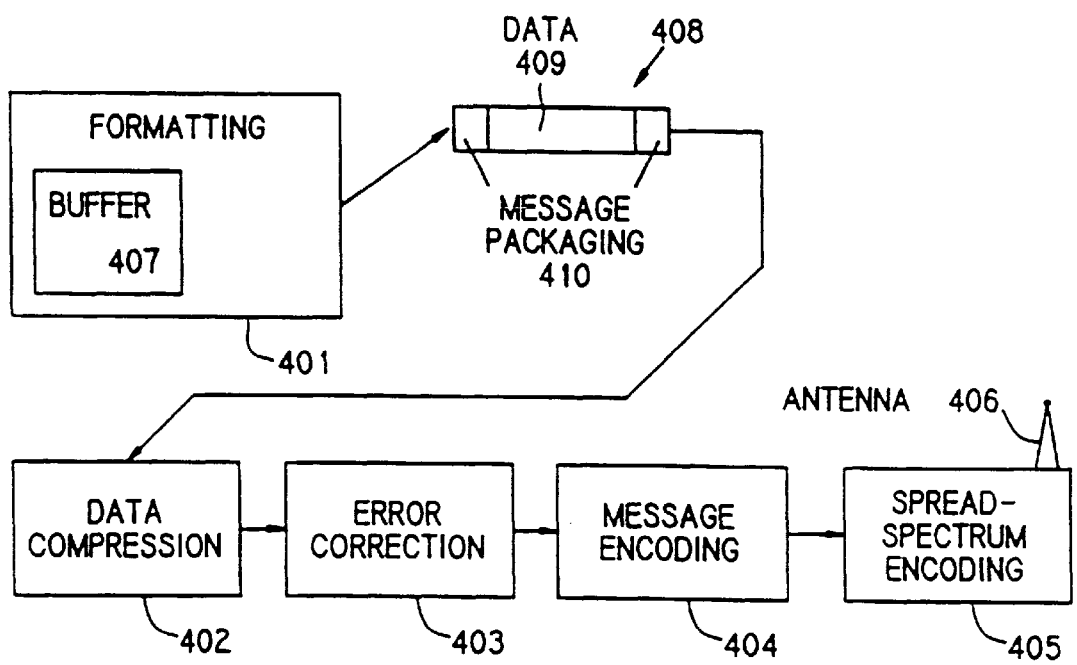
FIG. 4 shows a block diagram of a transmitter station.

FIG. 4 shows a block diagram of a transmitter station.

The transmitter station 102 may comprise a formatting module 401 for receiving data from the data source 101, a data compression module 402, an error correction module 403, a message encoding module 404, a spread-spectrum encoding module 405, and a transmitting antenna 406.

In a preferred embodiment, the formatting module 401 may comprise a buffer 407 for receiving data from the data source 101, and may generate a message signal 408 comprising the data to be published 409 and message packaging data 410, as is well known in the art of message transmission protocols. For example, in a preferred embodiment, messages may be addressed to individual subscriber stations 104 by indicating a 32-bit individual address in the message packaging data 410. In a preferred embodiment, the formatting module 401 may format data for a plurality of data channels, may multiplex the data to be published on each data channel, and may divide each data channel into up to 256 logical subchannels.

In a combination with a request by the subscriber station 104 for particular data or data services, the formatting module 401 may also generate usage data and related statistical data by review of the buffer 407 and the message packaging data 410. In a preferred embodiment, the formatting module 401 may generate usage data which correlates each subscriber station 104 with the data to be decoded by that subscriber station 104, and that usage data may be used to compute charges for subscribers stations 104 and to rate demand for particular data or data services.

In a preferred embodiment, the formatting module 401 may format text data in ASCII format, and may format image data in bitmap format at a resolution of 300×300 dots per inch, or more preferably, 400×400 dots per inch.

The data compression module 402 may encode the data to be published into a more compact form, as is well known in the art of data compression. In a preferred embodiment, the data compression module may use a Group III data compression technique for data which is designated to be output to a telecopier. In a preferred embodiment, data compression module 402 may use an ASCII compression technique for text data which is keyword searchable in compressed form, and may use a compression technique for image data which is automatically scaled for output to lower resolution printers or for display on a graphics monitor. Data compression techniques which do not use "alphabet extension" are preferred.

The error correction module 403 may encode the data to be published by adding error detection and correction information, as is well known in the art of error detection and correction. In a preferred embodiment, the error correction module 403 may use a forward error correction technique which adapts the degree of error detection and correction information to the type of data to be published, and which further adapts the degree of error detection and correction information to real-time error characteristics of the communication channel 103.

The message encoding module 404 may encode the data to be published to preserve its security against unauthorized reception. In a preferred embodiment, the message encoding module 404 may use a nonlinear cipher feedback shift register technique which processes data at about 10 kilobytes per second. In a preferred embodiment, data to be published may be divided into "files" and each file encoded with a file-specific key, and when received at the subscriber station, re-encoded after receipt with a station-specific or device-specific key. In a preferred embodiment, the message encoding module 404 may comprise a hardware encoding device which encodes one byte at a time.

In a preferred embodiment, a transmitter station 102 and/or subscriber station 104 transmits M-ary data bits per code sequence. In a particular embodiment, data bits are transmitted in quaternary operation, where each code sequence transmission represents two binary bits, represented by one of four binary states. The four binary states may, for example, be represented as:

| Code Sequence Number | Data Bits |
|---|---|
| 0 | 00 |
| 1 | 01 |
| 2 | 10 |
| 3 | 11 |

In a second embodiment, data bits are transmitted in 16-ary operation, wherein each code sequence transmission represents four binary bits, or one of sixteen binary states, which may be represented as:

| Code Sequence Number | Data Bits |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |
| 13 | 1101 |
| 14 | 1110 |
| 15 | 1111 |

The use of M-ary transmission may provide a number of advantages. For example, more subscriber stations 104 may be supported per transmitter station 102 for the same bandwidth. Another possible advantage is lower receiver complexity in the subscriber stations 104, which allows for a more practical implementation in handheld, battery powered devices such as telephones.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

In particular, a preferred embodiment of the invention is shown in which data to be published is broadcast by means of a satellite link from a transmitting station to a subscriber station. However, it would be clear to one of ordinary skill in the art, after perusal of the specification, drawings and claims herein, that the invention is also applicable to many different forms of transmission and media for broadcast. These many different forms of transmission and media for broadcast would be workable, and are within the scope and spirit of the invention.

For example, it would be clear to one of ordinary skill in the art that the invention would be equally workable with cable TV media, without essential change.

What is claimed is:

1. A method for broadcasting, comprising the steps of:

receiving information to be broadcast;

formatting said information to be broadcast into a broadcast signal;

transmitting said broadcast signal to a receiver via a first transmission protocol, said first transmission protocol comprising one of a plurality of transmission protocols, said plurality of transmission protocols comprising frequency band transmission protocols, mode transmission protocols and multiple access methodology protocols, said frequency band transmission protocols comprising a transmission protocol for a first set of frequency bands and a transmission protocol for a second set of frequency bands, said mode transmission protocols comprising a transmission protocol for a narrowband signal transmission and a protocol for a spread spectrum signal transmission, said multiple access methodology protocols comprising a code division multiple access transmission protocol, a frequency division multiple access transmission protocol, and a time division multiple access transmission protocol; and receiving said broadcast signal with a dual mode receiver contemporaneously with transmitting a signal via a second transmission protocol, wherein said first transmission protocol and said second transmission protocol comprise separate transmission protocols, said dual mode receiver comprising a mode controller, a first transmission protocol receiver, and a second transmission protocol receiver, said mode controller capable of selecting said first transmission protocol receiver or said second transmission protocol receiver.

2. The method for broadcasting of claim 1, wherein one of said first transmission protocol and said second transmission protocol is a protocol for cellular transmission and the other of said first transmission protocol and said second transmission protocol is a protocol for satellite transmission.

3. The method for broadcasting of claim 1, wherein one of said first transmission protocol and said second transmission protocol is a protocol for transmitting a narrowband signal and the other of said first transmission protocol and said second transmission protocol is a protocol for transmitting a spread-spectrum signal.

4. The method for broadcasting of claim 1, wherein said broadcast signal is transmitted via said first transmission protocol and, further, via a time division multiple access (TDMA) protocol, and said first transmission protocol receiver further comprises circuitry for decoding a TDMA transmitted broadcast signal.

5. The method for broadcasting of claim 1, wherein said information to be broadcast comprises one or more signals from a group comprising control signals, data, graphics, digitized voice, digitized images and moving video, and mixed media comprising any combination of control signals, data, graphics, digitized voice, digitized images or moving video.

6. A broadcast system comprising a subsystem and at least one subscriber station;

said subsystem comprising circuitry for formatting information to be broadcast via a first transmission protocol, wherein said first transmission protocol is one of a plurality of transmission protocols, said plurality of transmission protocols comprising frequency band transmission protocols, mode transmission protocols and multiple access methodology protocols, said frequency band transmission protocols comprising a transmission protocol for a first set of frequency bands and a transmission protocol for a second set of frequency bands, said mode transmission protocols comprising a transmission protocol for a narrowband signal transmission and a protocol for a spread spectrum signal transmission, said multiple access methodology protocols comprising a code division multiple access transmission protocol, a frequency division multiple access transmission protocol, and a time division multiple access transmission protocol, said subsystem further comprising a transmitter, said subsystem transmitter comprising an input comprising said formatted information to be broadcast, said subsystem transmitter comprising an output comprising a broadcast signal to be broadcast to said at least one subscriber station, said subsystem further comprising an antenna for use in transmitting said broadcast signal in accordance with one of said plurality of transmission protocols; and said subscriber station comprising a subscriber station transmitter and a subscriber station receiver, said subscriber station receiver comprising an antenna, said subscriber station receiver antenna capable of receiving a signal transmitted via said first transmission protocol and of receiving a signal transmitted via a second transmission protocol, wherein said second transmission protocol is one of said plurality of transmission protocols and is different from said first transmission protocol, said subscriber station receiver further comprising a mode controller, first transmission protocol receiver circuitry and second transmission protocol receiver circuitry, said mode controller capable of selecting first transmission protocol receiver circuitry or said second transmission protocol receiver circuitry, said first transmission protocol receiver circuitry comprising demodulating circuitry for demodulating a signal transmitted via said first transmission protocol, and said second transmission protocol receiver circuitry comprising demodulating circuitry for demodulating a signal transmitted via said second transmission protocol.

7. The broadcast system of claim 6, wherein said subscriber station first transmission protocol receiver circuitry is capable of receiving contemporaneously with said subscriber station transmitter transmitting a signal via said second transmission protocol.

8. The broadcast system of claim 6, wherein said first transmission protocol is a spread spectrum signal transmission protocol and said second transmission protocol is a narrowband signal transmission protocol.

9. The broadcast system of claim 6, wherein one of said subscriber station first transmission protocol receiver circuitry demodulating circuitry and said subscriber station second transmission protocol receiver circuitry demodulating circuitry comprises circuitry for satellite technology reception.

10. The broadcast system of claim 6, wherein said subsystem further comprises error correction circuitry, said error correction circuitry comprising an output comprising error detection and correction encoded information, said error detection and correction encoded information comprising an input to said subsystem transmitter.

11. The broadcast system of claim 6, wherein said subsystem further comprises message packing circuitry, said message packing circuitry comprising an output comprising packetized data, said packetized data comprising an input to said subsystem transmitter.

12. The broadcast system of claim 6, wherein said subsystem further comprises compression circuitry, said compression circuitry comprising an output comprising an encoded signal, said encoded signal comprising an input to said subsystem transmitter.

13. The broadcast system of claim 6, wherein said information to be broadcast comprises one or more signals from a group comprising control signals, data, graphics, digitized voice, digitized images and moving video, and mixed media comprising any combination of control signals, data, graphics, digitized voice, digitized images or moving video.

14. The broadcast system of claim 6, wherein said broadcast signal is transmitted by said subsystem transmitter via said first transmission protocol and, further, via time division multiple access (TDMA), and said subscriber station first transmission protocol receiver circuitry further comprises circuitry for decoding a TDMA transmitted broadcast signal.

15. The broadcast system of claim 6, wherein said subscriber station transmitter comprises an output comprising a signal, wherein said subscriber station transmitter output signal comprises a request for said subsystem transmitter output to be broadcast to said subscriber station.

16. A broadcast system comprising a subsystem and a plurality of subscriber stations;

said subsystem comprising circuitry for formatting information to be broadcast via a first transmission protocol, wherein said first transmission protocol is a hybrid protocol comprising a time division multiple access (TDMA) technique and at least one other technique, said subsystem further comprising a transmitter, said subsystem transmitter comprising an input comprising said formatted information to be broadcast, said subsystem transmitter comprising on output comprising a broadcast signal to be broadcast to two or more of said plurality of subscriber stations, said broadcast signal transmitted via said first transmission protocol; and each of said plurality of subscriber stations comprising a subscriber station transmitter and a subscriber station receiver, said subscriber station receiver of each of said plurality of subscriber stations comprising an antenna for receiving a signal transmitted via said first transmission protocol and for receiving a signal transmitted via a second transmission protocol, wherein said second transmission protocol is one of a plurality of transmission protocols, said subscriber station receiver of each of said plurality of subscriber stations further comprising a mode selector, a first transmission protocol receiver and a second transmission protocol receiver, said mode selector connected to said first transmission protocol receiver for outputting a signal transmitted via said first transmission protocol to said first transmission protocol receiver, said mode selector further connected to said second transmission protocol receiver for outputting a signal transmitted via said second transmission protocol to said second transmission protocol receiver, said first transmission protocol receiver comprising demodulating circuitry for demodulating a signal transmitted said first transmission protocol, and said second transmission protocol receiver comprising demodulating circuitry for demodulating a signal transmitted via said second transmission protocol.

17. The broadcast system of claim 16, wherein a subscriber station of said plurality of subscriber stations receives with said subscriber station first transmission protocol receiver contemporaneously with said subscriber station transmitter transmitting a signal via said second transmission protocol.

18. The broadcast system of claim 17, wherein said first transmission protocol is a spread spectrum transmission protocol.

19. The broadcast system of claim 16, wherein said plurality of transmission protocols comprises frequency band transmission protocols, said frequency band transmission protocols comprising a transmission protocol for a first set of frequency bands and a transmission protocol for a second set of frequency bands, mode transmission protocols, said mode transmission protocols comprising a transmission protocol for a narrowband signal transmission and a protocol for a spread spectrum signal transmission, and multiple access methodology protocols, said multiple access methodology protocols comprising a code division multiple access transmission protocol and a frequency division multiple access transmission protocol.

20. The broadcast system of claim 16, wherein one of said first transmission protocol and said second transmission protocol comprises a protocol for cellular transmission and the other of said first transmission protocol and said second transmission protocol comprises a protocol for satellite transmission.

* * * * *